March 23, 1965     H. L. BRUMP     3,174,603
CAM OPERATED TRANSVERSELY MOVING BALL CLUTCH
Filed May 24, 1961
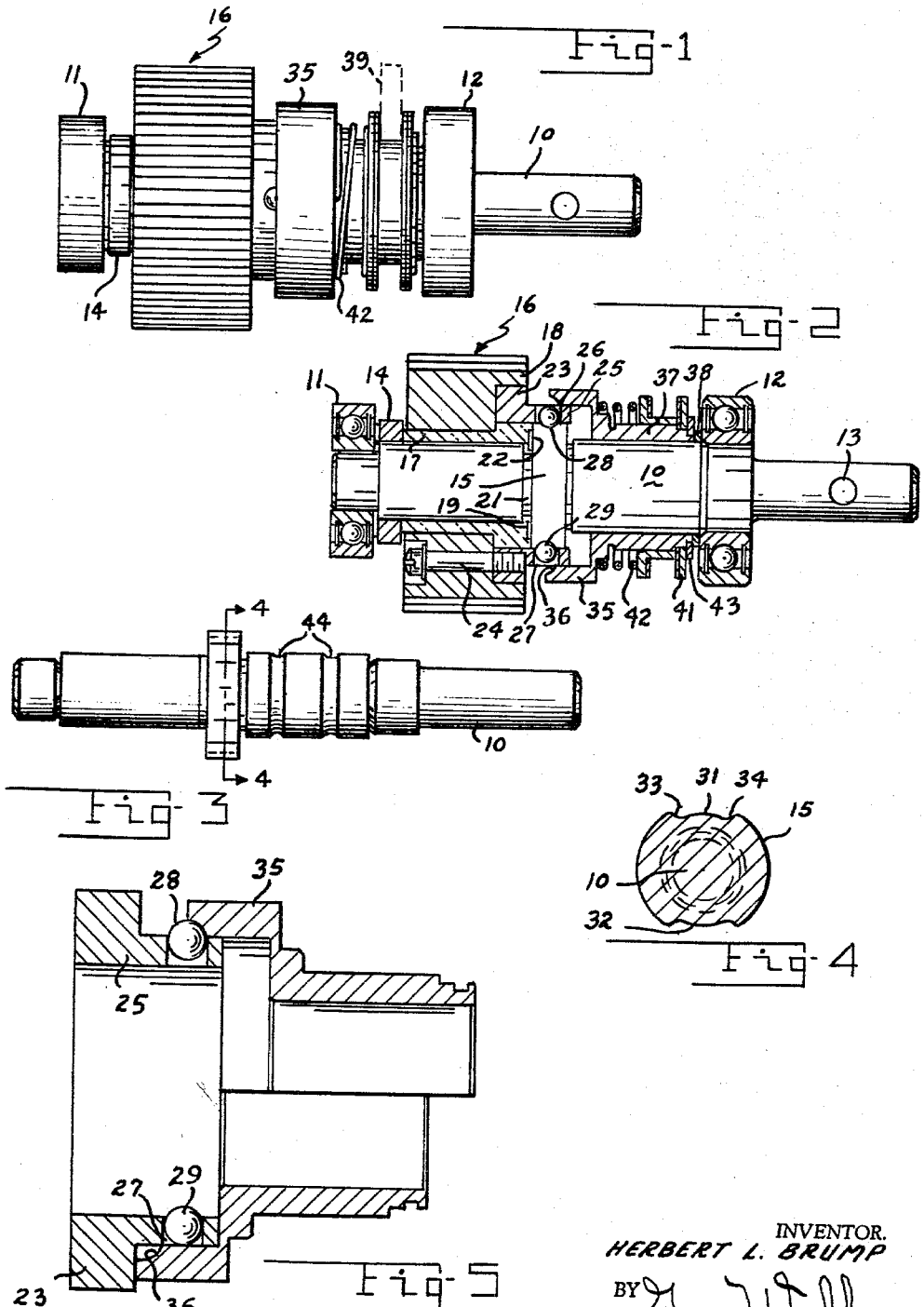
INVENTOR.
HERBERT L. BRUMP
BY Tom Walker
ATTORNEY

United States Patent Office 3,174,603
Patented Mar. 23, 1965

3,174,603
CAM OPERATED TRANSVERSELY MOVING
BALL CLUTCH
Herbert Leroy Brump, Dayton, Ohio, assignor to The
Reliance Electric and Engineering Company, Cleveland,
Ohio, a corporation of Ohio
Filed May 24, 1961, Ser. No. 112,284
6 Claims. (Cl. 192—93)

This invention relates to clutch mechanisms and has particular although not limited reference to clutches responding to actuating signals of varying strength, as for example to signals produced manually by remote control.

The object of the invention is to simplify the construction as well as the means and mode of operation of clutch mechanisms, whereby such mechanisms may not only be economically manufactured, but will be more efficient and satisfactory in use, adaptable to a wide variety of applications, and be unlikely to get out of order.

A further object of the invention is substantially to reduce the forces required to engage and disengage the clutch, especially in multiple shaft output drives and the like wherein the forces required to disengage one clutch and to engage another may be additive.

Another object of the invention is to provide a clutch which may be engaged and disengaged through exercise of relative light actuating forces and which requires practically no force to be held engaged.

A further object of the invention is to present a generally new device as described featuring a ball clutch and selectively operated spring means for engaging such clutch.

Still another object of the invention is to present a clutch mechanism in the form of an integrated assembly adapted to be substituted as a unit in existing machine environments.

A further object of the invention is to provide a clutch mechanism possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view in side elevation of a unitary clutch mechanism in accordance with the illustrated embodiment of the invention;

FIG. 2 is a view in longitudinal section of the clutch unit of FIG. 1;

FIG. 3 is a detail view of a shaft member comprised in the clutch unit;

FIG. 4 is a view in cross section taken substantially along the line 4—4 of FIG. 3; and FIG. 5 is an enlarged view of cooperating clutch elements in the clutch unit, shown in cross-section and being a composite view wherein the upper half shows the elements as they appear in a disengaged position of the clutch and the lower half shows the same parts as they appear in an engaged position of the clutch.

Like parts are indicated by similar characters of reference throughout the several views.

Referring to the drawing, the invention is disclosed as embodied in a unit adapted to be substituted in a multiple shaft output drive in accordance with which any one of a plurality of adjacent shafts may be selected for connecting to continuously operating power means. Thus, each such unit may comprise a shaft 10 rotatably mounted in a pair of longitudinally spaced apart bearing assemblies 11 and 12, these being in turn adapted for installation in a machine environment in which the shaft 10 is freely rotatable relative thereto. At what may be considered its outer end the shaft 10 is suitably formed, as by being reduced in diameter and formed with a transverse opening 13, to be connected in driving relation to operating parts of the machine.

At the opposite or inner end of the shaft is the bearing 11. A spacer 14 is rotatably mounted on the shaft 10 adjacent to the bearing 11. Interposed between such spacer and an annular flange 15 on the shaft is a drive 16 including a bushing 17 and, for example, a peripherally toothed gear body 18. The bushing 17 has at one end thereof an annular recess 19 which is in substantial alignment with undercut portion 21 in the shaft. It contacts the annular flange 15 through thrust washer 22 located in recess 19.

The side of the body 18 adjacent to the annular flange 15 is recessed to receive a ring member 23 secured to the body 18 by bolts 24. A sleeve 25 is integral with the ring member 23 and projects outwardly thereof in surrounding contacting relation to the annular flange 15. At diametrically opposed points in the sleeve 25 are radical openings 26 and 27 receiving respective balls 28 and 29 made of an incompressible material. The balls 28 and 29 have a diameter to be confined within their respective openings against lateral motion but are large in relation to the length of such openings whereby to project either through the inner or the outer periphery of the sleeve 25.

The construction and arrangement of parts accordingly is one in which the drive unit 16 rotates normally freely upon the shaft 10, carrying with it the sleeve 25 and supported balls 28 and 29 which ride the periphery of the annular flange 15. In the illustrative embodiment of the invention the drive unit 16 is adapted to be positively connected to a source of power for continuous rotation and may be in driving engagement with companion units of like clutch units in a multiple drive arrangement. In a manner to be described the drive unit is selectively coupled to the shaft 10 whereby the shaft may, under suitable control and for selected periods of time, rotate in unison with the power operated drive unit. If desired, power may be applied to shaft 10 with the output being through unit 16.

The periphery of the annular flange 15 is formed with diametrically opposed recesses or indentations 31 and 32. These are of identical construction. Each is circumferentially elongated in relation to the diameter of the balls 28 and 29 and at the ends or sides thereof merge with the normal diameter of the flange through inclined cam surfaces 33 and 34. Upon such rotary positioning of the shaft 10 as to place the indentations 31 and 32 in line with the balls 28 and 29 these balls are free to drop into or to enter into such recesses in a manner to lower the balls to or within the outer periphery of the sleeve 25 in such a manner as to be in non-projecting relation thereto. In the absence of any further control over the movement of the balls 28 and 29, rotary motion of the gear unit 16 carries the balls over the periphery of the flange 15 in the course of which motion the balls move into and out of the indentations 31 and 32, the outward motion being a radial thrust delivered as the balls are brought into engagement with the cam surfaces 33 or 34.

Acting to retain the balls in position in the sleeve 25, and controlling the reciprocable motion thereof, is a sleeve 35 a portion of which is in surrounding sliding contact with the outer surface of sleeve 25. At its inner extremity the sleeve 35 is cut away to form a concave surface 36 which when aligned with the balls 28 and 29 permits an outward thrust of such balls under the camming action of the annular flange 15. The sleeve 35 is a part of a sliding assembly further including an integrated bushing 37 adapted at its other end to limit against the bearing 12 through a spacer 38. The bushing 37 is of reduced diameter relative to the sleeve 35 and is mounted on the shaft 10 for relative rotary and longitudinal movements. It is set to different longitudinal positions of adjustment on the shaft by means of a yoke 39 engaging a collar 41 slidably mounted on the bushing 37. A compression spring 42 is interposed between the collar 41 and the rear of sleeve 35 and maintains the collar normally in a position seated on a split ring 43 installed in the periphery of the bushing 37 between the collar and the spacer 38.

At the urging of the yoke 39 the collar 41 is movable in advancing and retracting directions longitudinally of the shaft 10, which motion is partaken of by the bushing 37 and its integral sleeve 35. In a retracted position, as shown in FIG. 2, the concave surface 36 is, as described, aligned with the balls 28 and 29 and the sleeve 35 exercises no restriction upon free reciprocating motion of the balls as the gear unit turns upon the shaft 10. Moved in an advancing direction upon the inner sleeve 25, however, the outer sleeve 35 moves in telescoping relation to the inner sleeve and effectively closes the openings 26 and 27 to limit outward thrust of the balls 28 and 29. In this position of the parts the balls are prevented from being thrust outwardly by the cam surfaces 33 and 34 and so assume a wedged engagement with one of the said surfaces thereby locking the gear unit to the shaft for unison rotation. The spring 42 interposes a yield in the advancing motion of the sleeve 35 so that actual movement of the sleeve to locking position may await arrival of the balls 28 and 29 into positions of alignment with the indentations 31 and 32, should such parts be out of alignment at the moment of actuation of the collar 41 by yoke 39. Retraction of the outer sleeve 35 from a position closing openings 26 and 27 is a positive motion accomplished through engagement of the collar 41 with the lock ring 43.

The cam surfaces 33 and 34 are provided for alternate use, the clutch unit being adapted for reverse drive wherein the gear unit 16 may at times have rotation in one sense and at other times have rotation in the opposite sense. The shaft 10 is selectively clutched to the gear for rotation therewith by adjustment of the collar 41 as described and irrespective of the direction of rotation of the gear.

The clutch accordingly is engaged by a longitudinal advancing motion of the sleeve 35 upon the sleeve 25 and is disengaged by a reverse or retracting motion of such sleeve. In engaging the clutch it is thus unnecessary to mesh gears or to overcome the resistance of a heavy spring, the sliding motion of the sleeve 35 being entirely unresisted when the balls 28 and 29 are free to enter the indentations 31 and 32. The spring 42 may, in this connection, be made very light and should it be compressed in the actuation of the clutch the amount of required force is slight. In order further to facilitate clutch operation the engaged portions of the sleeves 35 and 36 may be made smooth and polished, as may the inner surface of the bushing 37 and the engaged portion of shaft 10. The latter may, as shown in FIG. 3, further be formed with annular grooves 44 which reduce friction and which may be lubricant filled in order further to promote an ease of sliding motion. Retraction of the sleeve 35 is equally uninhibited, the rotary thrust of the shaft 10 being in large part sustained by the sidewalls of the openings 26 and 27 and further dissipated by the freely rolling character of the balls 28 and 29. The ease of operation of the clutch is of particular utility in a known installation of the clutch unit which is in a power operated hospital bed. Through a manipulation of Bowden wire cables or the like from one end of the bed the patient is able by exerting only slight force selectively to engage and disengage clutch units at the opposite end of the bed to perform elevating, lowering or like function.

FIG. 5 shows in the upper half thereof the position of the inner and outer sleeve elements of the clutch as they appear when disengaged and showing the ball 28 thrust outward by engagement with the normal outer periphery of the annular flange 15. The lower half of the figure shows the opposite position of the parts or the engaged position of the clutch wherein sleeve 35 has been advanced upon sleeve 25 and effectively closed the opening 27 in a manner to preclude outward thrust of the ball 29. Should the ball 29, or whichever of the balls 28 or 29 is in a dependent position when the sleeve 35 is advanced upon inner sleeve 25, project outwardly of the sleeve 25 it is cammed inward by the advancing concave surface 36 and by the inner peripheral edge of the advancing sleeve. Since the inward movement of the ball is unopposed this camming motion makes no added demand on the force required for clutch engagement, which at no time exceeds the force necessary to overcome the relatively light compression spring 42. With the clutch engaged no appreciable forces are applied in a direction of disengagement so that practically no force is required to maintain the clutch in an engaged position.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises but one of several modes of putting the invention into effect, and the invention is therefore claimed in any of its forms or modifications within the legitimate and valid scope of the appended claims.

Having thus described my invention, I claim:

1. A selectively coupled drive unit, including a shaft, first and second sleeves on said shaft rotatable relatively to the shaft and to each other, said sleeves having interfitting portions, a ball clutch connection between the interfitting portion of one sleeve and said shaft made effective and ineffective by respective relative advancing and retracting sliding motions of the other said sleeve, said clutch including ball means movable entirely beneath the outer surface of said one sleeve to reduce the resistance to movement of said other sleeve in advancing and retracting motions as described, a positively movable shift member on said other sleeve and slidable relative thereto, means positively limiting relative motion of said shift member in one direction for positive actuation of said other sleeve in a retracting direction, and spring means between said shift member and said other sleeve adapted to be compressed by movement of said shift member in the opposite direction, whereby yieldingly to urge said other sleeve in an advancing direction, said spring means being relatively light whereby said ball clutch connection may be conditioned to become effective by relatively low applied pressure to said shift member.

2. A selectively coupled drive unit including a shaft having a circular flange thereon having a transverse peripheral indentation therein, a sleeve in relatively rotatable surrounding contacting relation to said flange and terminating at one end thereof adjacent to said flange, said sleeve having a radial opening in the transverse plane of said indentation, a ball confined in said opening against relative lateral motion and adapted to seat on said flange to drop into said indentation therein and to be projected therefrom upon rotation of said shaft relatively to said sleeve, a shift member arranged for relative longitudinal motion on said shaft and having a relatively expanded sleeve portion at one end receiving said one end of the first said sleeve and adjustable relatively thereto to close said opening and prevent projection of said ball from said indentation, said expanded sleeve portion having a concave end surface registerable with said opening in said first sleeve to allow projection of said ball while precluding loss thereof from said opening, said shift member further including a cylindrical bushing portion slidably mounted on said shaft and terminating at one end in said expanded sleeve portion, a radial fixed abutment at the other end of said cylindrical bushing portion, a collar slidable on said cylindrical bushing portion intermediate its ends, and a compression spring interposed between said collar and said expanded sleeve portion, said collar being operable through said spring yieldingly to advance said shift member in one direction and operable through said abutment member positively to retract said shift member in the opposite direction.

3. A unit according to claim 1 characterized by the respective interfitting surface portions of said sleeves being smooth and polished to provide for fluid movement of one sleeve relative the other.

4. A unit according to claim 1 characterized in that the portion of said shaft mounting said other sleeve is formed with annular grooves containing lubricant, facilitating an ease of sliding motion of said other sleeve relative said one sleeve.

5. A unit in accordance with claim 2 characterized in that the relatively adjacent surface portions of said sleeve and said sleeve portion are smooth and polished to provide for fluid movement of said shift member relative said sleeve.

6. A unit as set forth in claim 2 characterized by the portion of said shaft mounting said shift member being formed with annular grooves containing lubricant, facilitating an ease of sliding motion of said shift member relative said sleeve.

References Cited by the Examiner

UNITED STATES PATENTS

| | | | |
|---|---|---|---|
| 1,126,924 | 2/15 | Valoppi | 192—71 |
| 1,719,188 | 7/29 | Maybach. | |
| 2,101,366 | 12/37 | Frank | 192—71 |
| 2,245,017 | 6/41 | Sinclair. | |
| 2,498,399 | 2/50 | Dodge. | |
| 2,508,558 | 3/50 | Wolff. | |
| 2,803,145 | 8/57 | Fisher | 192—38 |
| 2,902,125 | 9/59 | House et al. | 192—45 |

FOREIGN PATENTS

| | | |
|---|---|---|
| 503,097 | 5/51 | Belgium. |
| 521,413 | 7/53 | Belgium |
| 1,175,218 | 3/59 | France. |

DAVID J. WILLIAMOWSKY, *Primary Examiner.*

THOMAS J. HICKEY, *Examiner.*